April 18, 1961 W. B. BRUENE 2,980,862
LINEAR LOW-INPUT R.F. IMPEDANCE AMPLIFIER
Filed July 7, 1958
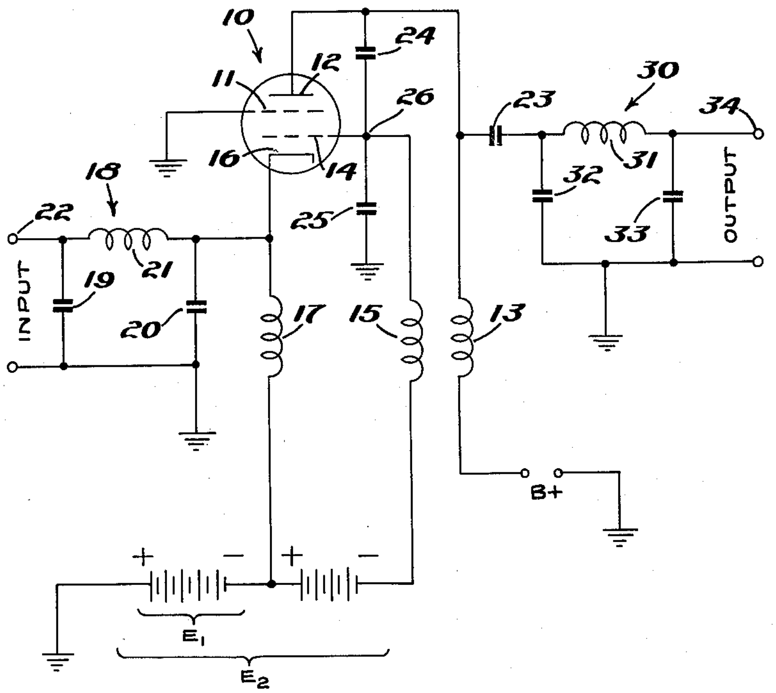
INVENTOR.
WARREN B. BRUENE
BY Marvin Moody
ATTORNEY

United States Patent Office 2,980,862

Patented Apr. 18, 1961

2,980,862

LINEAR LOW-INPUT R.F. IMPEDANCE AMPLIFIER

Warren B. Bruene, Cedar Rapids, Iowa, assignor to Collins Radio Company, Cedar Rapids, Iowa, a corporation of Iowa Filed July 7, 1958, Ser. No. 746,827

1 Claim. (Cl. 330—76)

This invention relates to a cathode-fed amplifier which utilizes a novel form of degenerative feedback to materially reduce the intermodulation products resulting from the amplifier.

With the advent of single sideband and other similar transmissions, extremely linear power amplifiers have become a necessity. In this type of transmission, the bandwidths of the frequency selective stages of the transmitters are such that they are not capable of eliminating all undesirable intermodulation products that are developed by non-linear amplifiers. On the one hand, triode tubes possess characteristics such that when used in an amplifier, the magnitude of the intermodulation products in comparison to the signal is very small, but requires high driving power in proportion to the output power delivered. On the other hand, tetrode tubes possess characteristics such that when used in an amplifier the magnitude of the intermodulation products is usually much larger than those developed in the triode amplifiers, but does have the advantage of requiring low driving power in proportion to the output power delivered. Thus the use of tetrode amplifiers has been limited to circuits where extremely linear circuits were not required.

It is therefore an object of this invention to materially reduce the intermodulation products developed by a single stage tetrode amplifier.

It is a further object of this invention to provide an economical and simple feedback network.

It is still a further object of this invention to provide a feedback network that is not frequency sensitive over the usable range of the amplifier.

It is a still further object of this invention by use of the novel feedback circuit to reduce the optimum plate current under zero signal conditions and thus reduce the plate dissipation of the tetrode tube.

It is a feature of this invention to provide a voltage feed-back network in a cathode-fed amplifier consisting of two serially connected capacitors so connected that they will apply a portion of the output voltage to the control grid thereby providing degenerative feedback, thus improving the linearity of the tetrode amplifier.

These and other objects and features will be apparent to one skilled in the art from the following specification and its accompanying drawing which shows a circuit diagram of one embodiment of this invention.

Referring now to the figure, a linear amplifier is shown which includes a tetrode tube 10 which has a grounded screen grid 11, a plate 12 returned to a source of B+ voltage through an isolation inductor 13. A control grid 14 is returned to a source of negative grid bias through an isolating choke 15. A cathode 16 is returned to another source of less negative bias $E_2$ through an inductor 17.

An input 22 is connected to the cathode through an impedance matching $\pi$ network 18 consisting of capacitors 19 and 20 forming the shunt members and inductor 21 forming the series member.

An output terminal 34 is connected to one side of a blocking capacitor 23 through an output $\pi$ network 30 consisting of an induction 31 forming the series member and capacitors 32 and 33 forming the shunt members. The other side of capacitor 23 is connected to the plate 12.

A voltage divider is formed by a pair of capacitors 24 and 25 connected in series. Capacitor 24 is connected between plate and the control grid, and capacitor 25 is connected between the control grid and ground. Without the feedback network provided by capacitors 24 and 25, the amplifier operates similarly to the usual well-known cathode-driven tetrode amplifier. Screen grid 11 is grounded to eliminate expensive low impedance screen by-pass condensers. This of necessity requires the control grid 14 and cathode 16 to be operated at below ground potential. The difference in the voltage between the cathode and grid is dependent upon the requirement of the grid bias for the tube used in the amplifier. A circuit has been constructed according to the principles of this invention in which the circuit parameter values are as follows:

Tube 10, type 4CX1000A
B+, 2,800 volts
$E_1$ grid voltage, −135 volts
$E_2$ cathode voltage, −200 volts
$C_{24}$, 10 mmf.
$C_{25}$, 250 mmf.

While these values were chosen for this particular embodiment, the invention is not so limited as to preclude others within the intent and scope of the invention.

In operation, a signal applied to input 22 is fed to the cathode 16. A positive going cathode will increase the grid bias which will in turn reduce the current through the tube and the external circuit of the amplifier. This will result in a positive increase of the voltage on the plate. Thus the voltage on the cathode and plate are in phase.

Degenerative feedback is used to improve the linearity of the circuit. Capacitors 24 and 25 act as a voltage divider between the plate 12 and circuit ground with the junctions 26 of the capacitive divider connected to the control grid. Thus an in-phase voltage with respect to the cathode is developed across the output of the divider at junction 26 and is applied to the control grid. The amount of voltage fed back to the control grid is determined by the ratio of the reactance of the capacitors 24 and 25. A circuit has been constructed which has 10 mmf. for capacitor 24 and 250 mmf. for capacitor 25 which provided 12 decibel feedback to the circuit. Intermodulation distortion products due to non-linearity of the tube plate characteristic are reduced by the amount of feedback used.

Since the feedback network is purely capacitive, a change in operational frequency of the amplifier will not result in a change in feedback voltage since the capacitive reactance of both condensers will increase or decrease in like proportion.

An additional advantage of the novel feedback circuit of this invention is that it allows the D.C. screen voltage $E_1$ to be of a value less than that of a similar amplifier that does not incorporate feedback.

In a class $AB_1$ amplifier, a minimum screen-to-cathode voltage is required to achieve a given peak plate current. When feedback is applied from the plate to the control grid, additional driving voltage is required on the cathode. This condition will increase the instantaneous screen-to-cathode voltage and thus will require less D.C. potential difference between them. The D.C. screen voltage can be reduced by the amount of feedback voltage applied to the control grid.

The optimum value of zero signal plate current for low distortion is related approximately to the three-halves power of the D.C. screen voltage. Thus a lower value of D.C. screen voltage requires less zero signal plate current and in turn will reduce the zero signal plate dissipation.

In actual practice, the amplifier will operate at the optimum value of zero signal plate current for low distortion, whereas without this type of feedback the zero plate current must be less than the optimum to avoid excessive plate dissipation.

Thus from the foregoing description it will be seen that a greatly improved amplifier has resulted with not only an improved linearity characteristic but also a novel feedback circuit that is not frequency sensitive over the normal operation of the amplifier.

Although this invention has been described with respect to a particular embodiment thereof, it is not to be so limited as changes and modifications may be made therein which are within the full intended scope of the invention as defined by the appended claim.

I claim:

A linear high radio frequency amplifier, comprising: a tetrode tube including a cathode, a control grid, a screen grid, and plate; means connected to the plate of said tetrode tube for supplying a positive direct voltage thereto; means connected to the cathode and control grid of said tetrode tube for supplying direct negative voltages thereto, the difference between the applied voltage to said cathode and the applied voltage to said control grid determining the bias of said tetrode tube; means connected with the cathode of said tetrode tube whereby a signal input may be coupled thereto; means connected with the plate of said tetrode tube whereby an output signal may be coupled therefrom; means connecting the screen grid of said tetrode tube to ground; voltage dividing means consisting of a first capacitor having one end connected to said plate and a second capacitor having one end connected to ground and the other end connected to the other end of said first capacitor; and means connecting said other ends of said capacitors to the control grid of said tetrode tube whereby a part of the voltage developed on said plate due to an incoming signal is applied to said grid independently of frequency variations and as degenerative feedback so that the magnitude of the intermodulation products will be reduced without undesirably affecting the linearity of said amplifier.

References Cited in the file of this patent

UNITED STATES PATENTS

| | | |
|---|---|---|
| 2,743,325 | Kaiser | Apr. 24, 1956 |
| 2,743,356 | Sziklai | Apr. 24, 1956 |
| 2,756,283 | Bach | July 24, 1956 |
| 2,795,655 | Scandurra | June 11, 1957 |

FOREIGN PATENTS

| | | |
|---|---|---|
| 498,359 | Belgium | Oct. 14, 1950 |

OTHER REFERENCES

Article I: Cathode Coupled Wide Band Amplifiers, Sziklai, RCA reprint from the Proceedings of the Institute of Radio Engineers, October 1945, pages 701–709 relied upon.